United States Patent
Baba et al.

(10) Patent No.: US 6,813,953 B2
(45) Date of Patent: Nov. 9, 2004

(54) PRESSURE SENSOR WITH A CORROSION-RESISTANT DIAPHRAGM

(75) Inventors: Hironobu Baba, Obu (JP); Yukihiro Kato, Kariya (JP); Hiroshi Nomura, Nagoya (JP); Haruhisa Koike, Kariya (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 10/419,224

(22) Filed: Apr. 21, 2003

(65) Prior Publication Data

US 2003/0200813 A1 Oct. 30, 2003

(51) Int. Cl.$^7$ .............................................. G01L 7/08
(52) U.S. Cl. ........................................................ 73/715
(58) Field of Search ................................. 73/700, 715

(56) References Cited

U.S. PATENT DOCUMENTS

| | | | |
|---|---|---|---|
| 5,076,147 A | * 12/1991 | Hegner et al. | 92/103 SD |
| 6,474,169 B1 | * 11/2002 | Aizawa et al. | 73/715 |
| 6,612,175 B1 | * 9/2003 | Peterson et al. | 73/708 |
| 2003/0150275 A1 | * 8/2003 | Wagner et al. | 73/715 |
| 2004/0040382 A1 | * 3/2004 | Peterson et al. | 73/708 |

FOREIGN PATENT DOCUMENTS

| JP | U-57-177147 | 5/1981 |
|---|---|---|
| JP | A-5-13782 | 1/1993 |
| JP | A-8-4918 | 1/1996 |
| JP | A-10-122995 | 5/1998 |
| JP | A-2001-272296 | 10/2001 |

* cited by examiner

Primary Examiner—Edward Lefkowitz
Assistant Examiner—Andre Allen
(74) Attorney, Agent, or Firm—Posz & Bethards, PLC (57) ABSTRACT

A pressure sensor includes a sensor device and a diaphragm. The diaphragm is exposed to a fluid, a pressure relative to which is detected using the sensor device. The diaphragm is made of a material having a pitting index, which is defined by the equation, (Cr+3.3Mo+20N), of 50 or greater and Ni content of 30 weight % or greater to prevent the diaphragm from corroding due to the fluid.

15 Claims, 9 Drawing Sheets

| EVALUATED MATERIAL | COMPONENTS (WEIGHT %) | | | | PITTING INDEX (Cr+3.3Mo+20N) | CORROSION |
|---|---|---|---|---|---|---|
| | Ni | Cr | Mo | N | | |
| SUS631 | 4.5 | 16.5 | 2.8 | 0.10 | 16.7 | YES |
| MATERIAL A | 0.17 | 21.9 | 2.0 | — | 28.5 | YES |
| MATERIAL B | 6.4 | 25.0 | 3.3 | 0.14 | 38.7 | YES |
| MATERIAL C | 35.5 | 23.3 | 7.5 | 0.22 | 52.5 | NO |
| MATERIAL D | 68.0 | 16.0 | 16.0 | — | 68.3 | NO |

RELATED ART

PRESSURE SENSOR WITH A CORROSION-RESISTANT DIAPHRAGM

CROSS REFERENCE TO RELATED APPLICATION

This application is based on and incorporates herein by reference Japanese Patent Application No. 2002-122335 filed on Apr. 24, 2002.

BACKGROUND OF THE INVENTION

The present invention relates to a pressure sensor in which a diaphragm is exposed to a fluid, the pressure related to which is to be measured by a sensor device. The pressure sensor is used, for example, for measuring a pressure loss by a diesel particulate filter (DPF) in an exhaust pipe of an automobile with a diesel engine.

In recent years, laws and regulations related to emission control have become more stringent, and there is a need to reduce soot from especially diesel engines. A technology that meets such a need is DPF. DPF is a system that relies on a filter for preventing soot from being released into the atmosphere. The filter is placed in an exhaust pipe to trap the soot. The trapped soot is combusted when a certain amount is accumulated. Normally, a ceramic filter is used. The volume of the trapped soot is critical for ensuring clean burning. An abnormal combustion can be caused by either too much of or too little of the soot and can lead to a problem such as a filter crack.

A method generally used today for detecting the amount of the trapped soot is based on a pressure loss by the filter. The pressure loss can be measured by either measuring only the pressure at an upstream position relative to the filter or by measuring the differential pressure between the pressure at an upstream position and that at a downstream position relative to the filter. However, when the soot is being burnt, the temperature of the gas near the DPF can rise up to 600° C. or as high as 1000° C. For this reason, it is not possible to directly attach a low cost pressure sensor such as a semiconductor pressure sensor, which is widely used for automotive applications, directly onto the exhaust pipe for measuring the pressure loss.

Instead, an additional pipe, such as a hose, is tapped into the exhaust pipe, and the pressure loss is measured by a pressure sensor attached to the hose at a location where the temperature of the exhaust gas is low enough.

However, because the exhaust gas, which is at a high temperature and has a high level of moisture, is cooled off, the pressure sensor is exposed to an environment with 100% humidity and condensed water. The inventors of the present invention studied the condensed water sampled from an automobile with a diesel engine. It turned out that the condensed water is very acidic having a pH as low as 2, which creates an extremely harsh environment. Pressure sensors are susceptible to corrosion in such a harsh environment with high acidity and high moistness.

SUMMARY OF THE INVENTION

The present invention has been made in view of the above aspects with an object to provide a pressure sensor suited for a use in a harsh environment for detecting the pressure of, for example, an exhaust gas.

To achieve the above object, a pressure sensor according to the present invention includes a sensor device and a diaphragm. The diaphragm is exposed to a fluid, the pressure relative to which is detected using the sensor device. The diaphragm is made of a material having a pitting index, which is defined by the equation, (Cr+3.3Mo+20N), of 50 or greater and Ni content of 30 weight % or greater to prevent the diaphragm from corroding due to the fluid.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE PREFERRED EMBODIMENTS

The present invention will be described in detail with reference to various embodiments. Parts that are common between the following embodiments are assigned the same reference numerals in the figures.

First Embodiment

As shown in FIGS. 10A to 10D, proposed semiconductor pressure sensors in general include a semiconductor sensor device J1, J9. When a pressure is applied on the sensor device J1, J9, the sensor device J1, J9 outputs an electrical signal in response to the pressure.

Figure 10A:
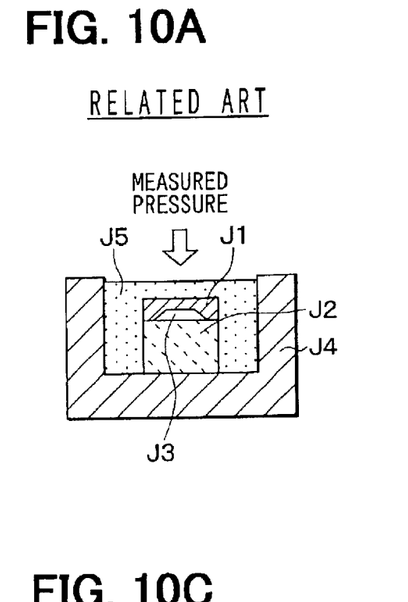
FIGS. 10A to 10D are schematic cross-sectional views of various proposed semiconductor pressure sensors.

The pressure sensor of FIG. 10A includes a semiconductor sensor chip J1 as a sensor device. The sensor chip J1 includes a semiconductor substrate that has a diaphragm. A pressure being measured is applied to the upper surface of the diaphragm in FIG. 10a. As shown in FIG. 10A, a stand J2, which is made of, for example, glass, has been bonded to the sensor chip J1 to form a vacuum chamber J3. The stand J2 has been fixed onto a casing J4. The inside of the casing J4 has been filled with a gel J5, which is made of, for example, an organic material, to seal the upper surface of the sensor chip J1, as shown in FIG. 10A.

Figure 10B:
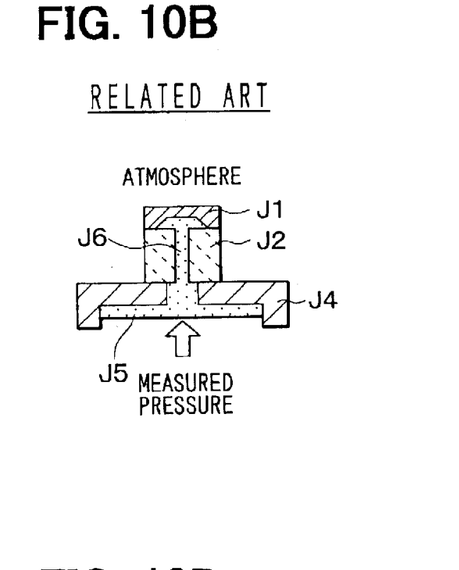

The pressure sensor of FIG. 10B includes a semiconductor sensor chip J1 as a sensor device, a stand J2, and a casing J4. As shown in FIG. 10B, a pressure intake passage J6, through which a pressure being measured is applied to the lower surface of the diaphragm of the chip J1, has been formed in the stand J2 and the casing J4. The pressure intake passage J6 has been filled with a gel J5. The upper side of the diaphragm is exposed to the atmosphere in FIG. 10B. In each of the pressure sensors of FIG. 10A and FIG. 10B, the pressure being measured is applied onto the diaphragm through the gel J5. Each of the sensor chips J1 outputs an electric signal in response to the diaphragm strain under the pressure.

According to the studies made by the inventors, moisture can permeate into the gel J5 in the pressure sensor shown in FIG. 10A and corrode the wiring lines located on the upper surface of the sensor chip J1. On the other hand, the pressure sensor shown in FIG. 10B does not have such a problem. However, the gel J5 itself may deteriorate in material properties when exposed to a water condensed from an exhaust gas, and eventually the pressure transmission characteristics of the gel J5 may change.

The pressure sensor in FIG. 1C includes a metal diaphragm J8. The diaphragm J8 has been formed as a part of a metal stem J7, and a semiconductor chip J9 that includes a strain gauge is located as a sensor device on the upper surface of the diaphragm J8 in FIG. 10C. In the pressure sensor in FIG. 10C, the pressure to be measured is applied to the inside surface of the diaphragm J8 as shown by an arrow in FIG. 10C, and the semiconductor chip J9 outputs an electric signal in response to the strain of the semiconductor chip J9, which is synchronously generated when the diaphragm J8 deforms due to the pressure.

Figure 10C:
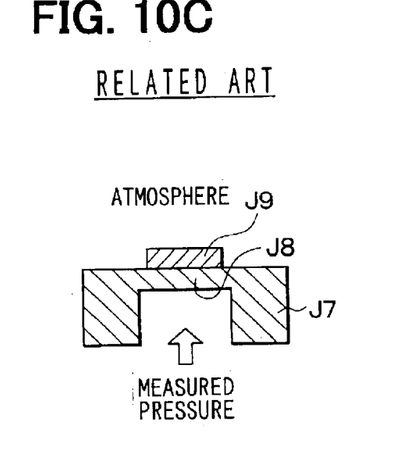
Figure 10D:
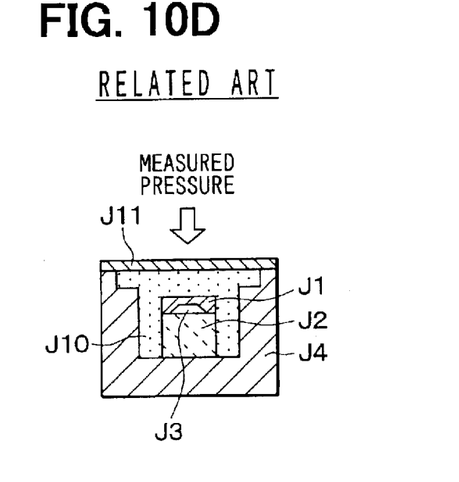

In the pressure sensor in FIG. 10D, a sensor chip J1 has been fixed onto a stand J2 in a casing J4, and the casing J4 has been filled with an oil J10 to seal the surface of the sensor chip J1. Furthermore, a metal diaphragm J11 has been bonded to the casing J4 to seal the oil J10. In the pressure sensor in FIG. 10D, the pressure being measured is applied onto the metal diaphragm J11. The pressure is transmitted through the oil J10 to the sensor chip J1.

In the pressure sensors shown in FIGS. 10C and 10D, the diaphragms J8, J11 are exposed to a fluid, the pressure of which is measured. According to the studies made by the inventors, there is a need to further improve corrosion resistance of the diaphragms J8, J11 in the harsh environment described earlier. A further study on the semiconductor pressure sensors shown in FIGS. 10C and 10D and experiments conducted by the inventors have led to a discovery of a material suitable for such a diaphragm that needs to have high corrosion resistance.

Figure 1:
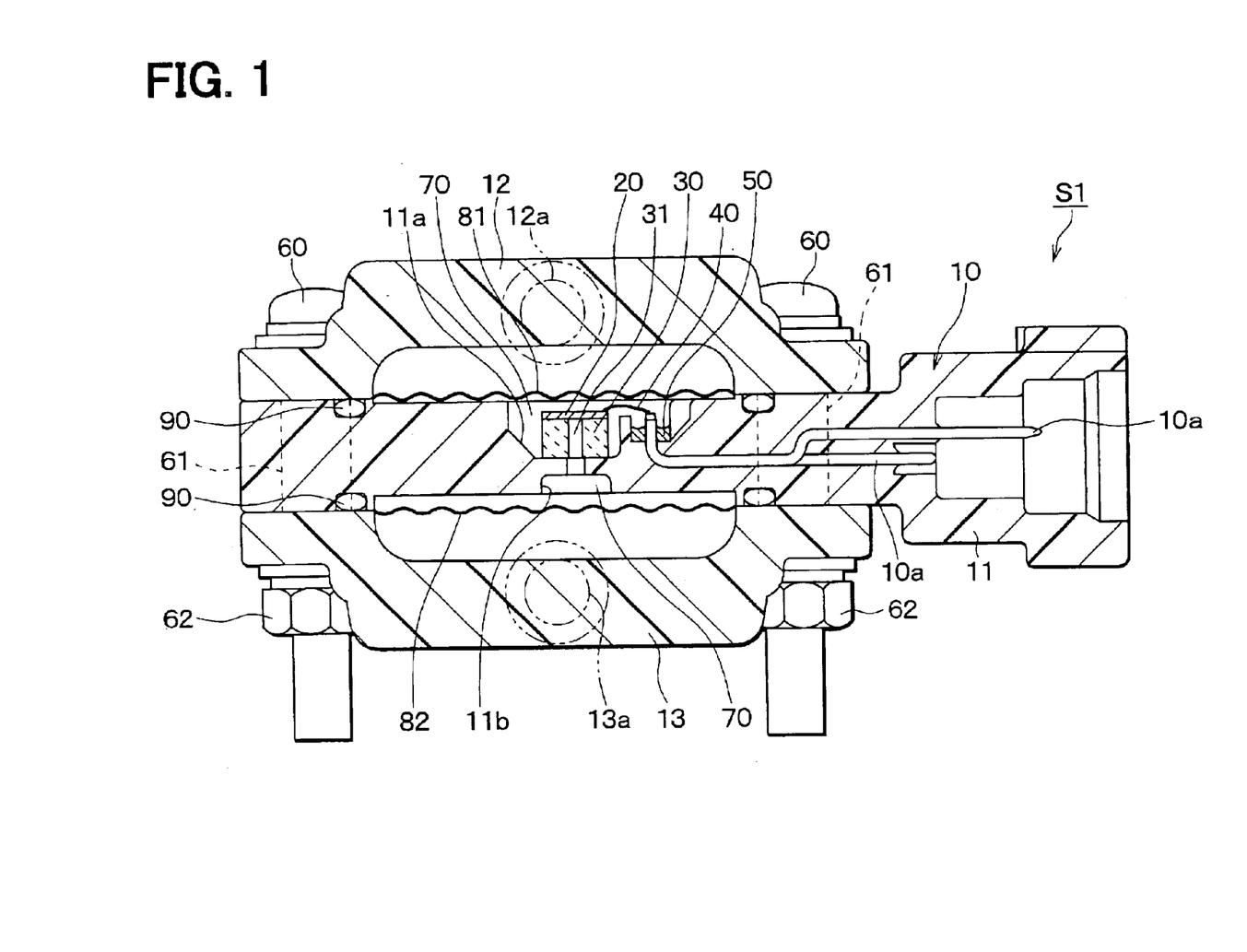
FIG. 1 is a schematic cross-sectional view of a pressure sensor according to a first embodiment of the present invention.

A pressure sensor S1 of FIG. 1 according to a first embodiment of the present invention is used for detecting a differential pressure. The pressure sensor S1 of FIG. 1 may be applied, but not limited, to a pressure sensor that is attached to an exhaust pipe in an automobile with diesel engine in order to detect a pressure loss by a DPF attached in the exhaust pipe. The pressure sensor S1 can detect the differential pressure between the pressure at an upstream position and that at a downstream position relative to the DPF in the exhaust pipe.

As shown in FIG. 1, a casing 10 that is made of, for example, a resin such as polybutylene telephthalate (PBT) and polyphenylene sulfide (PPS) makes up a main body of the pressure sensor S1. The casing 10 includes a connector case member 11 (sensor device placement member), in which terminals 10a have been insert-molded and on which a sensor device 20 is located. The casing 10 also includes a first port member 12 and a second port member 13, which have been assembled with the connector case member 11. Each of the members 11, 12, 13 of the casing 10 is formed by, for example, resin molding.

A first recess 11a is located on a first side, or the upper side, of the connector case member 11 in FIG. 1, while a second recess 11b is located on a second side, or the lower side, of the connector case member 11 in FIG. 1. The sensor device 20 is located in the first recess 11a in such a way as to close off the communication that otherwise would be formed between the first recess 11a and the second recess 11b.

The sensor device 20 generates electrical signals in response to the level of a pressure being applied. The sensor device 20 of FIG. 1 is a diaphragm-type semiconductor sensor chip, which includes a semiconductor substrate that is made of, for example, silicon and has a thin part as a diaphragm, although the diaphragm is not shown in the figure. A stand 30, which is made of, for example, glass, has been bonded to the sensor device 20 to integrate the sensor device 20 and the stand 30. The sensor device 20 has been bonded using the stand 30 to the bottom surface of the first recess 11a, as illustrated in FIG. 1. The stand 30 has been bonded to the bottom surface using an adhesive such as a silicone-type adhesive, which is not shown in the figure. The sensor device 20 has been thus stored and fixed in the first recess 11a.

As shown in FIG. 1, a through hole 31, which communicates with the second recessed part 11b, has been formed in the stand 30. However, the communication that otherwise would be formed between the first recess 11a and the second recess 11b has been closed off by the sensor device 20. The terminals 10a, which have been insert-molded in the connector case member 11, are used for picking up outputs from the sensor device 20 and made of a conductive metal such as copper. A first end of each of the terminals 10a is exposed inside the first recess 11a near the sensor device 20 and is electrically connected to the sensor device 20 by a wire 40 made of, for example, aluminum or gold.

A sealing material 50 has been placed around the first end of each of the terminals 10a, which is exposed inside the first recess 11a, in order to seal the gap between each of the terminals 10a and the connector case member 11. The sealing material 50 is made of, for example, a resin. Furthermore, the terminals 10a have been formed in such a way as to extend out substantially parallel to the surface of the casing 10 onto which the sensor device 20 has been mounted, or substantially parallel to the bottom surface of the recess 11a, from a position near the sensor device 20. A second end of each of the terminals 10a, which is opposite to the first end, is exposed from the body of the casing 10, or the body of the connector case member 11.

The second end of each of the terminals 10a can be electrically connected to external wiring lines, which are not shown in the figure, in order to permit the sensor device 20 to exchange signals with an external circuit such as an ECU in the automobile through the wires 40 and the terminals 10a. As thus described, the connector case member 11 of the casing 10 makes up a member on which the sensor device 20 is placed. Furthermore, the first port member 12 and the second port member 13 include first and second pressure introduction ports 12a, 13a, respectively, which are illustrated by concentric circles in dotted lines in FIG. 1.

In the pressure sensor S1 of FIG. 1, the connector case member 11 and the port members 12, 13 have been assembled together using screws 60 and nuts 61, 62, or screw members 60, 61, 62. The nuts 61 have been insert-molded in the connector case member 11. The connector case member 11 and the first and the second port members 12, 13 are screwed together first with the screws 60 and the nuts 61, and then the nuts 62 are screwed on. Rivets may be used instead of the screws 60 and the nuts 61, 62. Furthermore, the first recess 11a and the second recess 11b of the connector case member 11 have been filled with an oil 70, which is, for example, fluoride oil or silicone oil. A first diaphragm 81 has been fixed between the connector case member 11 and the first port member 12, while a second diaphragm 82 has been fixed between the connector case member 11 and the second port member 13 in the casing 10.

In the pressure sensor Si in FIG. 1, the first and the second diaphragms 81, 82 are both metal diaphragms made of a material having a pitting index, which is defined by the equation, (Cr+3.3Mo+20N), of 50 or greater and Ni content of 30 weight % or greater. The pitting index is a numerical value comparable to the sum of one times the Cr content in weight %, 3.3 times the Mo content in weight %, and 20 times the N content in weight % in the material that makes up the diaphragms 81, 82. That is, in the pressure sensor S1 in FIG. 1, the numerical value is equal to 50 or greater.

Figure 2:
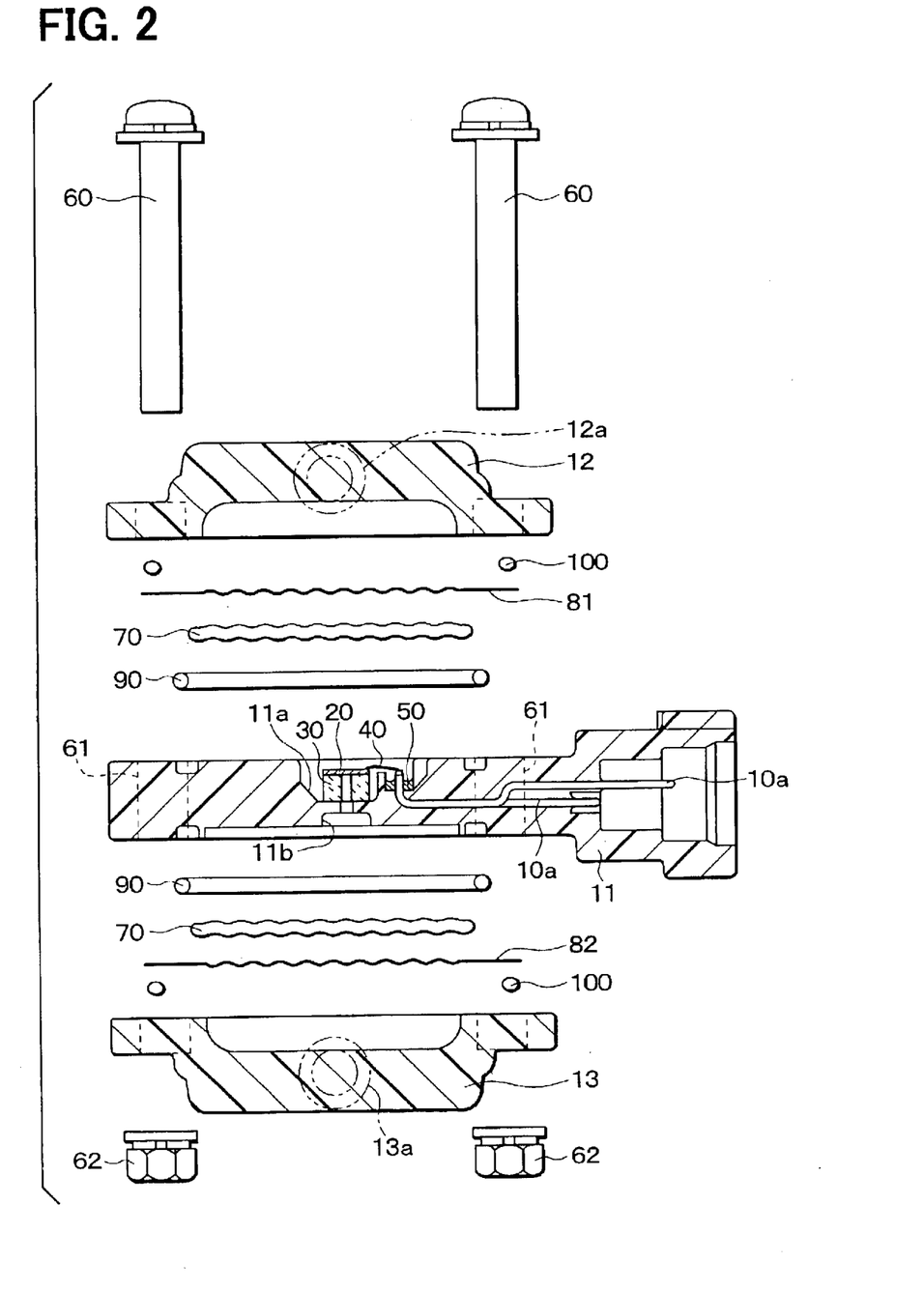
FIG. 2 is an exploded view of the pressure sensor in FIG. 1.

As shown in FIG. 1, the first diaphragm 81 has been placed in such a way as to cover the first recess 11a and to seal off the oil 70 located in the first recess 11a. On the other hand, the second diaphragm 82 has been placed in such a way as to cover the second recess 11b and to seal off the oil 70 located in the second recess 11b. Although not shown in FIG. 1, the first diaphragm. 81 and the second diaphragm 82, respectively, have been bonded to the first port member 12 and the second port member 13 using an adhesive made of a resin such as a fluorosilicone resin or a fluoride resin. In FIG. 2, reference numeral 100 denotes the adhesive, which will be described later.

O rings 90 have been placed on the connector case member 11 at the positions where the first and the second diaphragms 81, 82 have been pressed against the connector case member 11 in order to better seal the oil 70 with the first and the second diaphragms 81, 82. In the pressure sensor S1 in FIG. 1, the amount of the oil 70 that is located on one side of the sensor device 20, where the first diaphragm 81 is located, should preferably be the same as that on the other of the sensor device 20, where the second diaphragm 82 is located. This could be achieved by designing the pressure sensor S1 in consideration of the capacity of the first recessed part 11a, the capacity of the second recessed part 11b, and the volumes of the sensor device 20 and the stand 30.

Although not shown in the figure, the first pressure introduction port 12a, for example, may be connected to the exhaust pipe at a upstream position relative to the DPF, while the second pressure introduction port 13a may be connected to the exhaust pipe at a downstream position relative to the DPF using, for example, rubber hoses. With the above connections, the first diaphragm 81 is exposed to the pressure at the upstream position of the DPF, while the second diaphragm 82 is exposed to the pressure at the downstream position of the DPF in the casing 10. Then, the pressure applied to the first diaphragm 81 and the pressure applied to the second diaphragm 82 are transmitted to the sensor device 20 through the oil 70. The sensor device 20 detects the differential pressure between the pressure applied to the first diaphragm 81 and the pressure applied to the second diaphragm 82.

In the pressure sensor S1 of FIG. 1, the pressure at an upstream position of the DPF is applied through the first diaphragm 81 to the upper surface of a diaphragm that has been formed in the sensor device 20, although not shown in the figure, while the pressure at a downstream position of the DPF is applied through the second diaphragm 82 to the lower side of the diaphragm on the sensor device 20. The diaphragm of the sensor device 20 strains due to the differential pressure between the pressure at the upstream position and the pressure at the downstream position, and an electric signal in response to the strain is outputted from the sensor device 20 through the wires 40 and the terminals 10a to an outside circuit to detect the differential pressure.

Next, an example of a method for manufacturing the pressure sensor S1 of FIG. 1 will be described by referring to FIG. 2. First, each first end of terminals 10a, which is exposed inside a first recess 11a, is sealed with a sealing material 50 in a connector case member 11, in which the terminals 10a and nuts 61 have already been insert-molded. Then, a stand 30, which has been integrated with a sensor device 20, is fixed to a predetermined position in the first recess 11a of the connector case member 11 using adhesion, and the sensor device 20 and the terminals 10a are connected by wire bonding.

Next, a first diaphragm 81 is fixed onto a first port member 12 using an adhesive 100, and an oil 70 is injected into the first recess 11a. An O ring 90 is set on the connector case member 11. Then, the connector case member 11 and the first port member 12 are integrated by screwing them together with screws 60 and the nuts 61 in vacuum in order to seal the oil 70. The screws 60 are tightened in such a way as to avoid creating bubbles in the oil 70.

Next, similar to the first port member 12, a second port member 13 is also screwed on to the connector case member 11 in vacuum using nuts 62 with a second diaphragm 82, an oil 70, and an O ring 90 therebetween. Finally, tuning and inspection are performed to complete a pressure sensor S1 shown in FIG. 1.

In the sensor S1 of FIG. 1, the diaphragms 81, 82 are made of a material having a pitting index, which is defined by an equation, (Cr+3.3Mo+20N), of 50 or greater and Ni content of 30 weight % or greater. Therefore, although the diaphragms 81, 82 are exposed to a harsh operating environment that contains highly acidic water condensed from exhaust gas, the diaphragms 81, 82 are able to offer improved resistance to corrosion compared with the diaphragms of proposed pressure sensors.

Next, the basis of having chosen a material having a pitting index, which is defined by an equation, (Cr+3.3Mo+20N), of 50 or greater and Ni content of 30 weight % or greater for the diaphragms 81, 82 will be described. The material was chosen on the basis of the following experimental results obtained by the inventors.

The inventors studied the composition of water condensed from exhaust gas emitted from a diesel engine of an actual automobile and found that the condensed water was highly acidic with a pH of as low as 2. An analysis on the condensed water showed the existence of oxidizing bases like $NO_3^-$ and $SO_4^{2-}$ and reducing bases like $Cl^-$, $CH_3COO^-$ and $HCOO^-$, all of which drive corrosion. Especially, $Cl^-$ drives pitting corrosion.

The inventors prepared a variety of samples of materials that are made of elements that are considered suppressing corrosion at various contents. The elements that are considered effective for preventing corrosion are Cr against the oxidizing bases, Ni and Mo against the reducing bases, and Cr, Mo and N against bases that drive pitting corrosion. Then, the inventors performed corrosion tests using quasi-condensed water, which was prepared on the basis of the above composition analysis on the actually condensed water.

Figure 3:
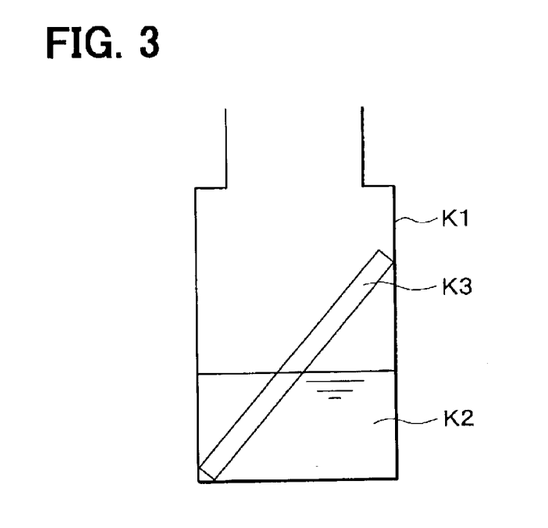
FIG. 3 is a view illustrating a corrosion resistance test in moist and dry environments.

The method for the corrosion tests will be explained with reference to FIG. 3. First, quasi-condensed water K2 is added to a glass jar K1, and then a test piece K3 is soaked into the quasi-condensed water K2. Then, the quasi-condensed water K2 is evaporated at 80° C. until the quasi-condensed water K2 completely dries up. After that, the test piece K3 is examined to see whether the test piece K3 corrodes or not. The test results are summarized in FIG. 4.

Figure 4:
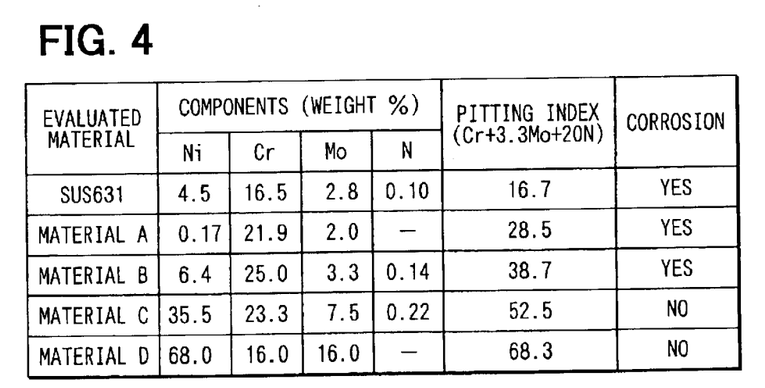
FIG. 4 is a table in which the results of the corrosion resistance test are summarized.

As shown in FIG. 4, materials A, B, C, and D, which have a different weight percent combination of Ni, Cr, Mo and N, and SUS 631, which is a material widely used for proposed diaphragms, were respectively used for making up the test piece K3. In FIG. 4, the weight percent combinations of the above elements and the pitting indexes of the materials, which are defined by the equation, (Cr+3.3Mo+20N), are shown.

As shown by the results in FIG. 4, SUS 631 and the materials A and B corroded, so the corrosion resistances thereof are insufficient in a harsh environment in which a DPF is used. On the other hand, the materials C and D, which have a pitting index of 50 or greater and Ni content of 30 weight % or greater, did not corrode, so the corrosion resistances thereof are high enough in a harsh environment in which a DPF is used.

The above experimental results are the basis of having chosen a material having a pitting index, which is defined by an equation, (Cr+3.3Mo+20N), of 50 or greater and Ni content of 30 weight % or greater for the diaphragms 81, 82. By using such a material for the diaphragms 81, 82, it is possible to prevent the diaphragms 81, 82 from corroding even in a corrosive harsh environment having high temperature and high moisture. Therefore, the pressure sensor S1 of FIG. 1 is suitable for use in a harsh environment in order to detect the pressure of, for example, exhaust gas.

Furthermore, the sensor device 20 in the pressure sensor S1 of FIG. 1 is sealed in the oil 70, so the sensor device 20 is not exposed to a harsh operating environment including, for example, water condensed from exhaust gas.

In the pressure sensor S1 of FIG. 1, the amount of the oil 70 that is located on the first side of the connector case member 11, where the former diaphragm 81 is located, is substantially equal to the amount of the oil 70 that is located on the second side of the connector case member 11, where the later diaphragm 82 is located.

If the amount of oil 70 were significantly different between the two sides, a significant error could be caused in the sensor output when the oil 70 thermally expands or contracts to generate a wrong differential pressure between the two sides. In order to prevent the above problem, it would be necessary to make the diaphragms 81, 82 large, so that the diaphragms 81, 82 would deform easily to damp the wrong differential pressure between the two sides using the deformations of the diaphragms 81, 82.

In contrast, in the pressure sensor S1 of FIG. 1, the amount of the oil 70 that is located on the first side of the connector case member 11, where the former diaphragm 81 is located, is substantially equal to the amount of the oil 70 that is located on the second side of the connector case member 11, where the later diaphragm 82 is located. Therefore, the thermal contraction and expansion of the oil 70 on one side cancels out those of the oil 70 on the other side, and the error in the sensor output is significantly reduced.

Figure 5:
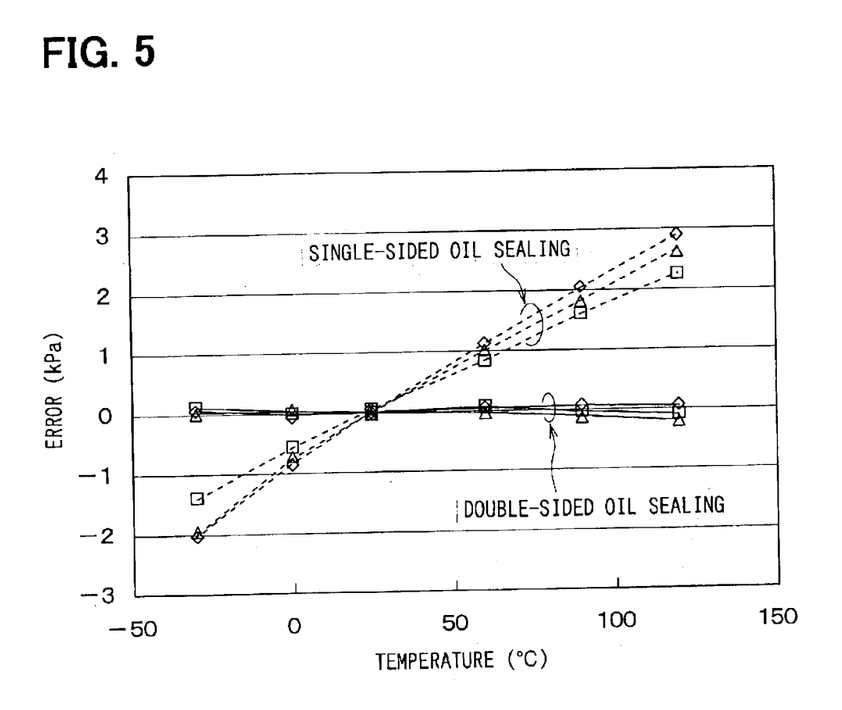
FIG. 5 is a graph showing the advantage of equating the amount of oil on the side of the first diaphragm with that on the side of the second diaphragm.

FIG. 5 shows the advantage of equating the amount of the oil 70 on the first side with that on the second side. In FIG. 5, the magnitude of error in pressure measurement is shown in kPa at various temperatures (° C.). The error here refers to the pressure obtained when the actual differential pressure to be detected is at 0 kPa. The magnitude of the pressure outputted when the actual differential pressure to be detected is at 0 kPa and the temperature of the oil 70 is at 25° C. is used as a criterion for 0 kPa in detected pressure.

In FIG. 5, the "double-sided oil sealing" refers to the results obtained from a plurality of the pressure sensors Si of FIG. 1, in each of which the amount of the oil 70 on the first side is substantially equal to that on the second side. For the sake of comparison, the correlation between the error and the temperature was also measured using a plurality of reference sensors, in each of which an oil has been filled on only one side. In FIG. 5, "single-sided oil sealing" refers to the results obtained from the reference sensors. Specifically, the reference sensors are ones according to a second embodiment, which will be described later.

As shown in FIG. 5, because of the thermal expansion or contraction of the oil, each of the reference sensors is susceptible to an error of as much as 3 kPa even when the actual pressure to be detected is at 0 Pa, as though a pressure was being applied to the sensor device from the outside. On the other hand, with respect to the pressure sensor S1 of FIG. 1, the error is substantially negligible because the thermal expansion and contraction of the oil 70 is substantially canceled out in the pressure sensor S1 of FIG. 1. Therefore, as far as the pressure sensor S1 of FIG. 1 is concerned, the diaphragms 81, 82 do not need to be relatively large in order to damp the wrong differential pressure due to the thermal expansion and contraction of the oil 70 using the deformations of the diaphragms 81, 82. Thus, the diaphragms 81, 82 can be relatively small, and, as a result, the pressure sensor S1 can be relatively small.

In the pressure sensor S1 of FIG. 1, the casing 10 is made of a resin, and the first diaphragm 81 and the second diaphragm 82 have been respectively bonded to the first port member 12 and the second port member 13 using the adhesive 100, which is made of a resin. Furthermore, the connector case member 11 includes the terminals 10a for picking up signals from the sensor device 20, and the terminals 10a extends substantially parallel to a surface of the casing 10 on which the sensor device 20 is located from a position near the sensor device 20. Furthermore, the connector case member 11 and each of the port members 12, 13 have been assembled together using the screw members 60, 61 62.

Figure 6:
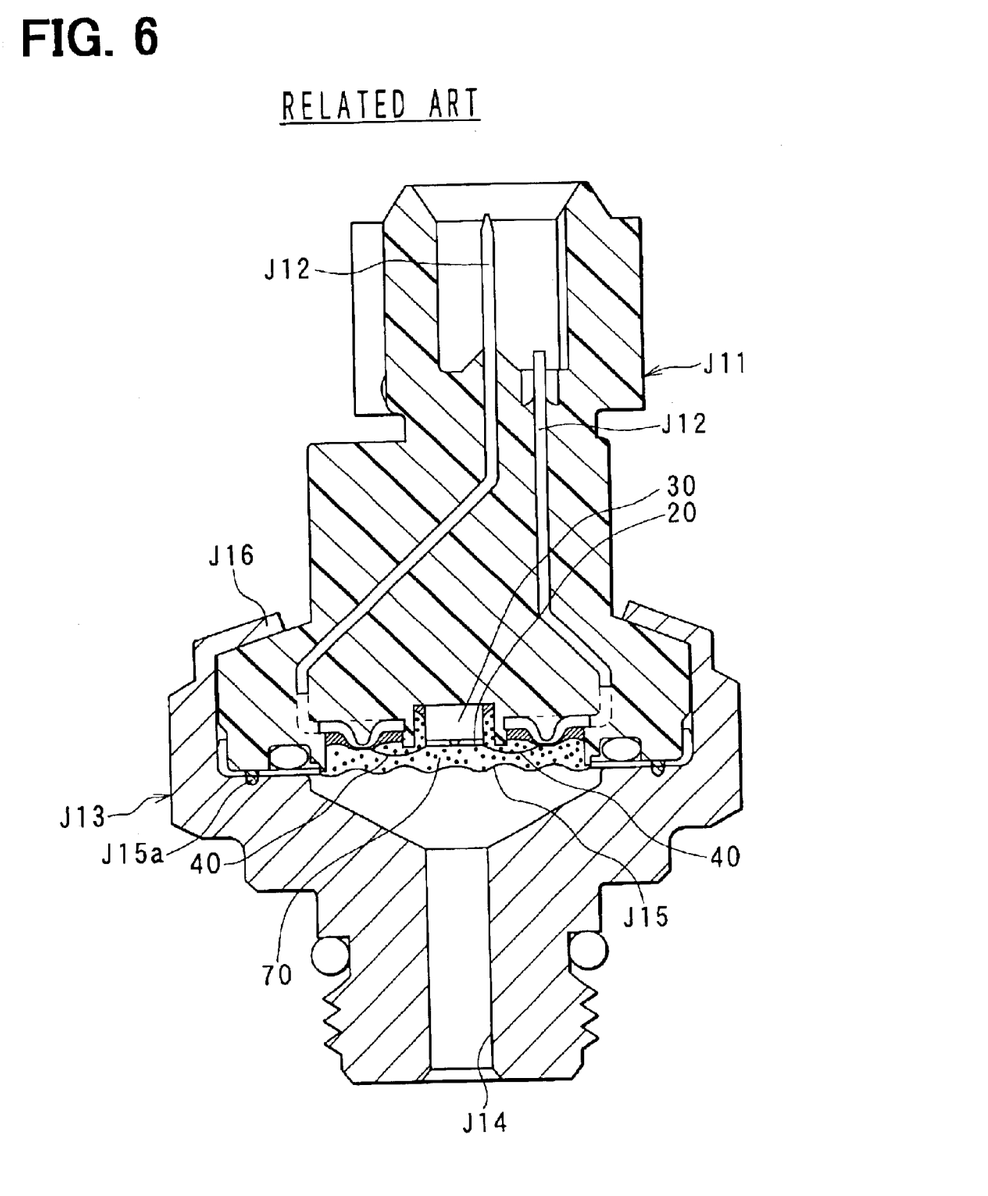
FIG. 6 is a schematic cross-sectional view of a proposed oil-sealed-type semiconductor pressure sensor.

Advantages in relation to the above characteristics of the pressure sensor S1 of FIG. 1 will be described next comparing with a proposed, oil sealed, semiconductor pressure sensor, the cross-section of which is shown in FIG. 6. The pressure sensor of FIG. 6 will be reviewed briefly first.

As shown in FIG. 6, a stand 30, on which a sensor device 20 is located, has been fixed using an adhesion to the lower end of a connector case member J11, which is made of a resin. Terminals J12 have been insert-molded in the connector case member J11, and the sensor device 20 is electrically connected to the terminals J12 by wire bonding. A housing J13 is made of a metal such as steel and includes a pressure introduction hole J14. A metal diaphragm J11 has been fixed onto the housing J13 by welding the entire perimeter of the diaphragm J15 to the housing J13. In FIG. 6, the welded part is denoted by a reference numeral J15a. The connector case member J11 and the housing J13 have been joined together by fitting the connector case member J11 into the housing J13 and clamping the connector case member J11 using an end portion J16 of the housing J13 all the way around the perimeter of the connector case member J11.

By joining the connector case member J11 and the housing J13 together, a detection chamber, which is closed off by the connector case member J11 and the diaphragm J15, is created. The detection chamber contains the sensor device 20 and has been filled with oil 70. The pressure to be measured is transmitted through the pressure introduction hole J14 toward the diaphragm J15 in the pressure sensor of FIG. 6. The pressure applied on the diaphragm J15 is transmitted to the sensor device 20 by the oil 70. The sensor device 20 outputs electric signals in response to the level of the pressure. The outputted electric signals are transmitted to an external circuit from the sensor device 20 through the terminals J12.

In the pressure sensor of FIG. 6, as described above, the diaphragm J15 for sealing the oil 70 is fixed onto the housing J13 by welding. With such a structure, even if the diaphragm J15 were made to have high corrosion resistance, the welded part J15a might still be susceptible to corrosion in a harsh environment that includes highly acidic water condensed from exhaust gas. In addition, because the housing J13 itself is also made of a metal, a proper selection of the material is required in consideration of corrosion resistance.

In contrast, the pressure sensor S1 of FIG. 1 does not have such a potential corrosion issue at the part where the diaphragms 81, 82 are attached to the casing 10 because the diaphragms 81, 82 are fixed onto the port members 12, 13 of the casing 10 using the adhesive 100, which is made of a resin. The casing 10 itself is also corrosion-free because the portions of the casing 10 exposed to exhaust gas are also made of a resin.

The pressure sensor of FIG. 6 also includes the terminals J12 in the connector case member J11 for picking up the output from the sensor device 20. The terminals J12, however, extends from a position near the sensor device 20 in a direction orthogonal to the surface on which the sensor device 20 is mounted, or vertically in FIG. 6. In such an instance, as understood from FIG. 6, it is difficult to place the oil 70 on both sides of the sensor device 20 for measuring a differential pressure, because it is difficult to secure enough space for placing the oil 70 on the side on which the terminals J12 is located, or on the upper side of the sensor device 20 in FIG. 6.

On the other hand, in the pressure sensor S1 of FIG. 1, the terminals 10a extend substantially parallel to the surface on which the sensor device 20 is mounted from a position near the sensor device 20, so adequate spaces for forming an oil sealed chamber, or the first recess 11a, can be easily secured on the upper side of the sensor device 20 in FIG. 1 without being blocked by the terminals 10a. That is, a pressure sensor capable of detecting a differential pressure can be easily manufactured.

In the pressure sensor of FIG. 6, the connector case member J11 and the housing J13 have been joined together by clamping the connector case member J11 using the end portion J16 of the housing J13. On the other hand, in the pressure sensor S1 of FIG. 1, it would not be possible to clamp down the entire perimeter of the connector case member 11 and the port members 12, 13, because the pressure introduction ports 12a, 13a for tapping into pipes jut out of the port members 12, 13 and the connector case member 11 are larger than the port members 12, 13. If the entire perimeter is not clamped all the way, the assembly reliability may become insufficient.

Therefore, the screw members 60, 61, 62 are used in the pressure sensor S1 of FIG. 1, so that the connector case member 11 and the port members 12, 13 are assuredly joined together. However, when the pressure sensor S1 of FIG. 1 is to be mounted in a car, a bracket for mounting the pressure sensor S1 onto the automobile body can be easily attached to the pressure sensor S1 by screwing it using the screws 60.

Second Embodiment

Figure 7:
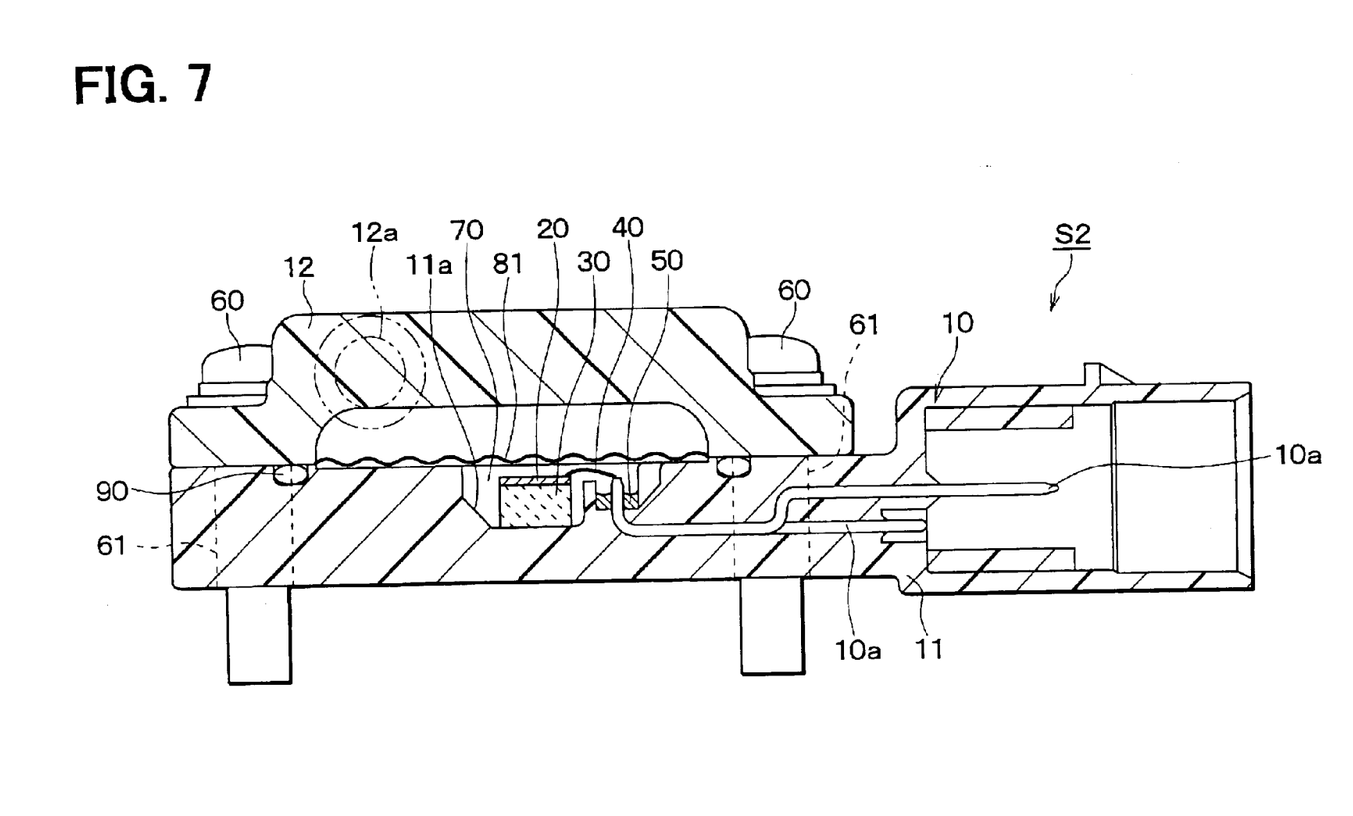
FIG. 7 is a schematic cross-sectional view of a pressure sensor according to a second embodiment of the present invention.

A pressure sensor S2 of FIG. 7 according to second embodiment is used for detecting an absolute pressure. The pressure sensor S2 of FIG. 7 may be applied, but not limited, to a pressure sensor that is installed in an exhaust pipe in an automobile with diesel engine in order to detect a pressure loss by a DPF, which is installed in the exhaust pipe. The pressure sensor S2 may detect the pressure level at an upstream position relative to the DPF in the exhaust pipe.

In the pressure sensor S2 of FIG. 7, a casing 10 is made of a resin such as PPS and PBT. The casing 10 includes a connector case member 11 (sensor device placement member) and a port member 12. The connector case member 11 includes terminals 10a. The port member 12 has been attached to the connector case member 11 and includes a pressure introduction port 12a. The port member 12 is similar to the first port member 12 in the pressure sensor S1 of FIG. 1, although the position of the pressure introduction port 12a is slightly different.

As shown in FIG. 7, a recess 11a has been formed on only one side of the connector case member 11. The recess 11a is similar to the first recess 11a in the pressure sensor S1 of FIG. 1. A sensor device 20 for pressure detection has been placed inside the recess 11a. The sensor device 20 outputs electrical signals in response to the level of the pressure being applied, just as in the same manner the sensor device 20 in the pressure sensor SI of FIG. 1 does, although the pressure being measured is an absolute pressure. The sensor device 20 in the pressure sensor S2 of FIG. 7 is also a diaphragm-type semiconductor sensor chip, which includes a semiconductor substrate that is made of, for example, silicon and has a thin part as a diaphragm, although the diaphragm is not shown in the figure.

A stand 30, which is made of, for example, glass, has been bonded to the sensor device 20 to integrate the sensor device 20 and the stand 30. The sensor device 20 has been bonded using the stand 30 to the bottom surface of the recess 11a. The stand 30 has been bonded to the bottom surface using an adhesive such as a silicone-type adhesive, which is not shown in the figure. The sensor device 20 has been thus stored and fixed in the recess 11a. The stand 30 in the pressure sensor S2 of FIG. 7 does not include any through hole, although the stand 30 in the pressure sensor S1 of FIG. 1 does. Instead, a pressure reference chamber, which is, for example, a vacuum chamber, has been formed between the sensor device 20 and the stand 30, although the reference chamber is not illustrated in the figure.

A first end of each of the terminals 10a, which have been insert-molded in the connector case member 11, is exposed inside the recess 11a near the sensor device 20 and is electrically connected to the sensor device 20 by a wire 40 made of, for example, aluminum or gold. A sealing material 50 has been placed around the first end of each of the terminals 10a, which is exposed inside the first recess 11a, in order to seal the gap between each of the terminals 10a and the connector case member 11. The sealing material 50 is made of, for example, a resin.

As shown in FIG. 7, in the pressure sensor S2 of FIG. 7 as well, the connector case member 11 of the casing 10 makes up a sensor device placement part, on which the sensor device 20 is placed.

The connector case member 11 and the port member 12 have been assembled together by screws 60 and nuts 61. The nuts 61 have been insert-molded in the connector case member 11. The connector case member 11 and the port member 12 have been screwed together with the screws 60 and the nuts 61. Rivets may be used instead of the screws 60 and the nuts 61.

Oil 70, which is, for example, fluoride oil or silicone oil, has filed the recess 11a of the connector case member 11. A diaphragm 81 has been fixed between the connector case member 11 and the port part 12 in the casing 10. The diaphragm 81 is similar to the first diaphragm 81 in the pressure sensor S1 of FIG. 1. In the pressure sensor S2 of FIG. 7 as well, the diaphragm 81 is a metal diaphragm made of a material having a pitting index, which is defined by the equation, (Cr+3.3Mo+20N), of 50 or greater and Ni content of 30 weight % or greater.

As shown in FIG. 7, the diaphragm 81 has been placed in such a way as to cover the recess 11a and to seal off the oil 70 located in the recess 11a. The diaphragm 81 has been bonded to the port member 12 using an adhesive made of a resin such as a fluorosilicone resin or a fluoride resin, although the adhesive is not illustrated in FIG. 7,. A reference numeral 100 is assigned to this adhesive in FIG. 8, which will be described later.

Just as in the same manner that the O rings 90 in the pressure sensor S1 of FIG. 1 have, an O ring 90 has been placed on the connector case member 11 where the diaphragm 81 has been pressed against the connector case member 11 in order to better seal the oil 70 with the diaphragm 81. Although not shown in the figure, the pressure introduction port 12a of the port member 12, for example, may be connected to the exhaust pipe at an upstream position of the DPF using, for example, a rubber hose. With the above connection, the diaphragm 81 is exposed to the pressure at the upstream position of the DPF.

The pressure applied to the diaphragm 81 is transmitted to the sensor device 20 through the oil 70. The diaphragm in the sensor device 20 strains due to the transmitted pressure, and an electric signal in response to the strain is outputted from the sensor device 20 through the wires 40 and the terminals 10a to an outside circuit to detect the pressure.

Figure 8:
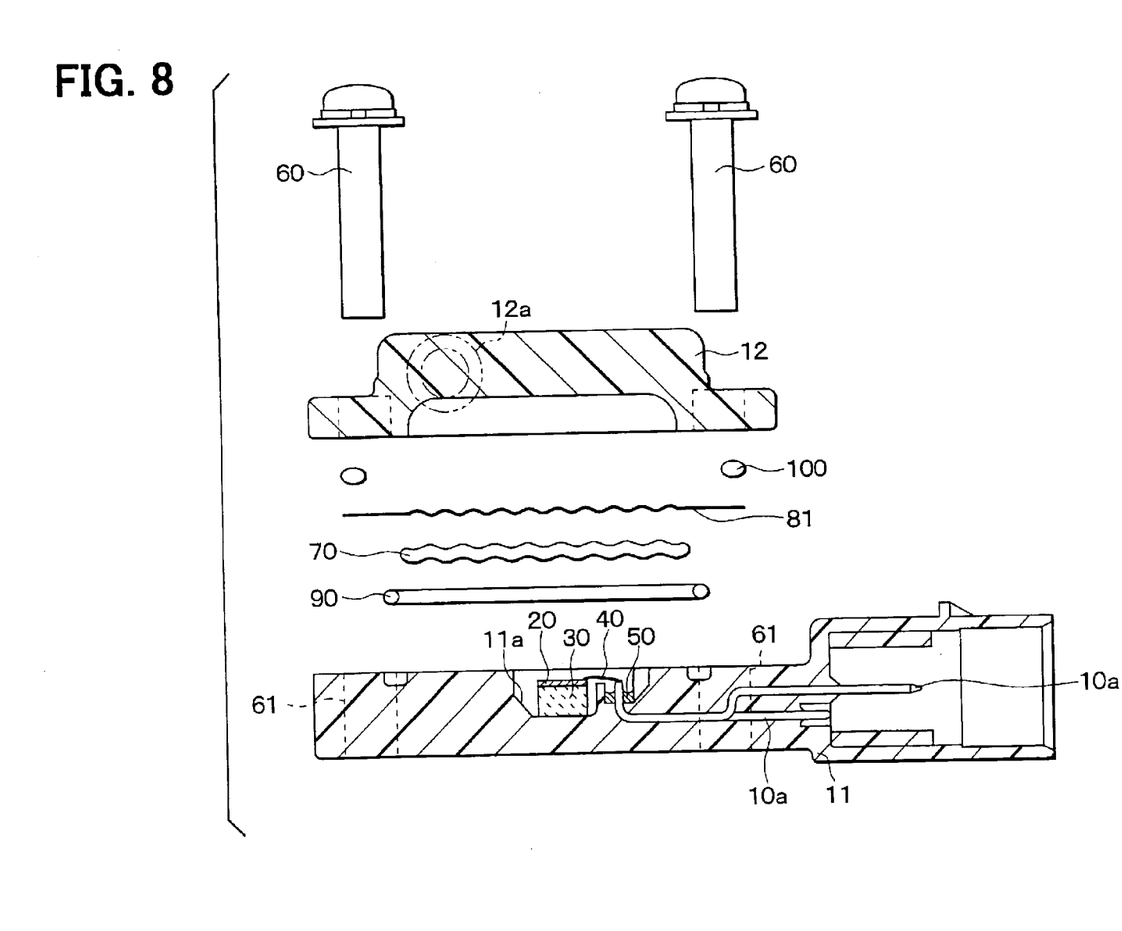
FIG. 8 is an exploded view of the pressure sensor in FIG. 7.

Next, an example of a method for manufacturing the pressure sensor S2 of FIG. 7 will be described by referring to FIG. 8. First, each first end of terminals 10a, which is exposed inside a recess 11a, is sealed with a sealing material 50 in a connector case member 11, in which the terminals 10a and nuts 61 have already been insert-molded. Then, a stand 30, which has been integrated with a sensor device 20, is fixed to a predetermined position in the recess 11a of the connector case member 11 using adhesion, and the sensor device 20 and the terminals 10a are connected by wire bonding.

Next, a diaphragm 81 is fixed onto a port member 12 using an adhesive 100, and an oil 70 is injected into the recess 11a. An O ring 90 is set on the connector case member 11. Then, the connector case member 11 and the port member 12 are integrated by screwing them together with screws 60 and the nuts 61 in vacuum in order to seal the oil 70. The screws 60 are tightened in such a way as to avoid creating bubbles in the oil 70. Finally, tuning and inspection are performed to complete a pressure sensor S2 shown in FIG. 7.

The pressure sensor S2 of FIG. 7, the diaphragm 81 is made of a material having a pitting index, which is defined by an equation, (Cr+3.3Mo+20N), of 50 or greater and Ni content of 30 weight % or greater to prevent the diaphragm 81 from corroding. Therefore, although the diaphragms 81 is exposed to a harsh operating environment that contains highly acidic water condensed from exhaust gas, the diaphragm 81 is able to offer improved resistance to corrosion compared with the diaphragms of proposed pressure sensor.

The reason for having chosen the material having the pitting index, which is defined by an equation, (Cr+3.3Mo+20N), of 50 or greater and Ni content of 30 weight % or greater for the diaphragm 81 is the same as described earlier with reference to FIG. 3 and FIG. 4.

By using such a material for the diaphragm 81, it is possible to prevent the diaphragm 81 from corroding even in a corrosive harsh environment having high temperature and high moisture. Therefore, the pressure sensor S2 of FIG. 7 is suitable for use in a harsh environment in order to detect the pressure of, for example, exhaust gas. Furthermore, the sensor device 20 in the pressure sensor S2 of FIG. 7 is sealed in the oil 70, so the sensor device 20 is not exposed to a harsh operating environment having, for example, water condensed from exhaust gas.

Furthermore, the adhesive 100, the terminals 10a, and the screw members 60, 61 in the pressure sensor S2 of FIG. 7 have characteristics similar to those in the pressure sensor S1 of FIG. 1 and function in the same manner that those in the pressure sensor S1 of FIG. 1 do. That is, the casing 10 is made of a resin, and the diaphragm 81 has been fixed onto the port member 12 using the adhesive 100 made of a resin. As a result, the fixed portions of the diaphragm 81 and the port member 12 are corrosion-free as well as the casing 10 itself. Furthermore, the terminals 10a extend substantially parallel to the surface on which the sensor device 20 is mounted from a position near the sensor device 20 in the casing 10. Furthermore, the connector case member 11 (sensor device placement member) and the port member 12 have been assembled together using the screw members 60, 61.

As described earlier, when the pressure sensors S1, S2 are used for the DPF application, the pressure sensor S2 of FIG. 7, which detects an absolute pressure, is used only for measuring the pressure level at an upstream position relative to the filter, while the pressure sensor S1 of FIG. 1, which detects a differential pressure, is used for measuring the differential pressure between the pressure at an upstream position and the pressure at a downstream position relative to the filter.

The range of pressure levels in the DPF application would be 60 to 200 kPa for the absolute pressure at an upstream position relative to the filter and 20 to 50 kPa for the differential pressure between the pressure at an upstream position and the pressure at a downstream position of the filter. Therefore, the range of pressure level is relatively low in the pressure sensor S1 of FIG. 1.

In general, the output from a pressure sensor is more influenced by expansion and contraction of the oil 70 as the pressure level to be measured becomes lower. For this reason, a diaphragm with larger diameter, which easily deforms to damp the expansion and contraction of the oil 70, should be used in the pressure sensor S1 of FIG. 1 to decrease the influence of the expansion and contraction of the oil unless the amount of the oil 70 that is located on the first side of the connector case member 11 was substantially equal to the amount of the oil 70 that is located on the second side of the connector case member 11.

On the other hand, if the pressure level to be measured is high enough, the influence of the expansion and contraction in the oil on the output is negligible. Therefore, there is no need to be used a diaphragm with larger diameter in the pressure sensor S2 of FIG. 7.

As understood when FIG. 1 and FIG. 7 are compared, the pressure sensor S1 of FIG. 1 and the pressure sensor S2 of FIG. 7 have similar parts. Therefore, the two pressure sensors S1, S2 can share some parts. Especially, because there is no need to enlarge the diameters of the diaphragms 81, 82 in the pressure sensor S1 of FIG. 1 as described earlier, it is possible to use the same diaphragm size in the pressure sensor S2 of FIG. 7 and in the pressure sensor S1 of FIG. 1. Therefore, it is possible to share a manufacturing line for, for example, forming the diaphragms 81, 82, sealing the oil 70, and assembling the diaphragms 81, 82.

Third Embodiment

Figure 9:
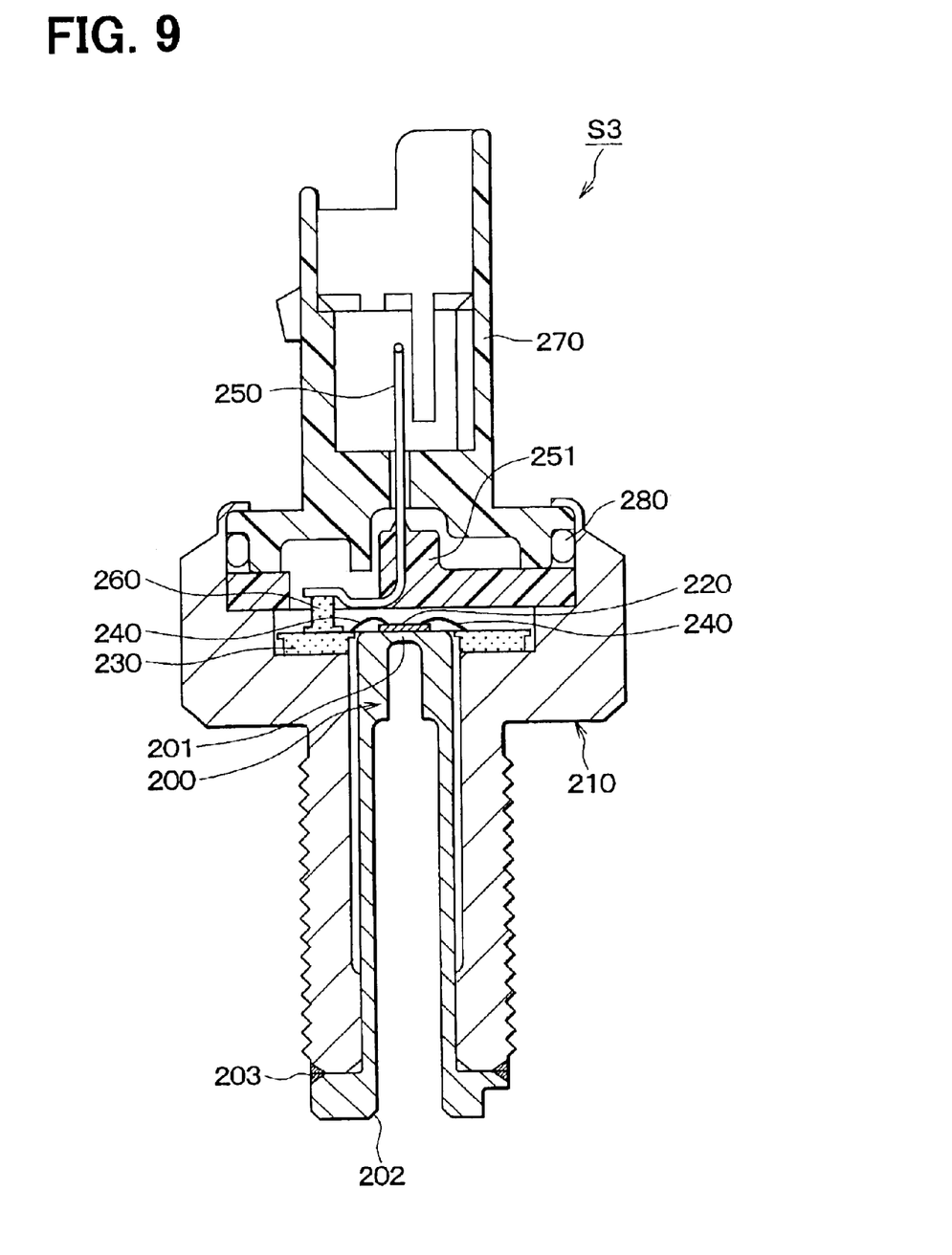
FIG. 9 is a schematic cross-sectional view of a pressure sensor according to a third embodiment of the present invention.

As shown in FIG. 9, a pressure sensor S3 according to a third embodiment includes a metal stem 200, which is in the shape of a hollow cylinder. The stem 200 includes a thin diaphragm 201 at the upper end and an opening 202 at the lower end in FIG. 9. The stem 200 is accommodated by a metal housing 210.

The stem 200 and the housing 210 have been welded all the way around their perimeters at their lower ends in FIG. 9A to form a welded part 203 that connects the stem 200 to the housing 210. A pressure to be measured is transmitted to the inside surface of the diaphragm 201 through the opening 202 of the stem 200. A sensor chip 220, which is a semiconductor sensor device including, for example, a silicon substrate, has been attached onto the outside surface of the diaphragm 201 using, for example, a glass with low melting point, although the glass is not shown in the figure.

The sensor chip 220 includes gauges, which are not shown in the figure. The sensor chip 220 strains synchronously to change an electric characteristic of the gauges when the diaphragm 201 strains due to the pressure to be measured. For example, the gauges are resistors that are formed by diffusion in the silicon substrate and make up a bridge circuit that permits the sensor chip 220 to output signals correlated to the pressure to be measured.

A ceramic substrate 230, which is a circuit board for amplifying and adjusting the output signals from the sensor chip 220, is located outside the sensor chip 220 in a recess located at the upper end of the housing 210. The ceramic substrate 230 includes IC chips for signal amplification and signal tuning. The IC chips are electrically connected to the sensor chip 220 by bonding wires 240. The ceramic substrate 230 is electrically connected to terminals 250 with pins 260, although only a pair of terminal 250 and pin 260 is illustrated in FIG. 9. The ceramic substrate 230, the pins 260, and the terminals 250 may be connected together by, for example, welding. The terminals 250 have been insert molded in a resin 251, and the resin 251 has been fixed to and supported by the housing 210.

As shown in FIG. 9, a connector case 270, which is made of, for example, a resin, has been joined to the upper end of the housing 210. The gap between the connector case 270 and the upper end of the housing 210 has been sealed using an O ring 280. The connector case 270 has been clamped all the way around the perimeter using the tip of the upper end of the housing 210, so that the housing 210 and the connector case 270 are hermetically connected together.

In the pressure sensor S3 of FIG. 9, when the diaphragm 201 strains due to the pressure to be measured, the sensor chip 220 outputs signals correlated to the pressure to be measured as described earlier. The signals are processed by the ceramic substrate 230 and are transmitted to an outside circuit through the pins 260 and the terminals 250. In the pressure sensor S3 of FIG. 9, the stem 200 is made of a material having a pitting index, which is defined by the equation, (Cr+3.3Mo+20N), of 50 or greater and Ni content of 30 weight % or greater.

Therefore, in the pressure sensor S3 of FIG. 9 as well, the diaphragm 201 has higher corrosion resistance than proposed pressure sensors, so the pressure sensor S3 of FIG. 9 is suitable for a use in a harsh environment in order to detect the pressure of, for example, exhaust gas. Furthermore, the pressure sensor S3 of FIG. 9 may also be used for measuring a high pressure such as an exhaust pressure near a turbo charger other than the DPF application described earlier.

In the pressure sensors S1, S2, S3 of FIGS. 1, 7, and 9, the diaphragms 81, 82, 201 are made of a material having a pitting index, which is defined by the equation, (Cr+3.3Mo+20N), of 50 or greater and Ni content of 30 weight % or greater. However, as concluded on the basis of the table in FIG. 4, the diaphragms 81, 82, 201 are more preferably made of a material having a pitting index, which is defined by the equation, (Cr+3.3Mo+20N), of 52.5 or greater and Ni content of 35.5 weight % or greater to prevent the pressure sensors S1, S2, S3 from corroding.

What is claimed is:

1. A pressure sensor comprising:
   a sensor device; and
   a first diaphragm, wherein the first diaphragm is exposed to a first fluid, a pressure relative to which is detected using the sensor device, and wherein the first diaphragm is made of a material having a pitting index, which is defined by an equation, (Cr+3.3Mo+20N), of 50 or greater and Ni content of 30 weight % or greater to prevent the first diaphragm from corroding due to the first fluid.

2. The pressure sensor according to claim 1, wherein the sensor device is connected to the diaphragm such that the sensor device strains synchronously with the diaphragm in response to the pressure to output an electric signal correlated to a level of the pressure.

3. The pressure sensor according to claim 1 further comprising:
   a casing, which includes a recess, wherein the sensor device is located in the recess; and
   an oil, wherein the recess is filled with the oil, wherein the first diaphragm is located above the recess to seal the oil, and wherein the pressure is transmitted to the sensor device through the first diaphragm and the oil.

4. The pressure sensor according to claim 1 further comprising:
   a casing, which has a first side and a second side, which is opposite to the first side, wherein the casing includes a first recess on the first side and a second recess on the second side and wherein the sensor device is located inside the first recess to close off a communication that otherwise would be formed between the first recess and the second recess in order to enable the sensor device to be pressurized from the first and second sides;
   an oil, which is located on the first side and the second side, wherein the recesses are filled with the oil; and
   a second diaphragm, wherein the first diaphragm is located above the first recess to seal the oil located in the first recess, wherein the second diaphragm is exposed to a second fluid, wherein the second diaphragm is located above the second recess to seal the oil located in the second recess, wherein a pressure of the first fluid is transmitted to the sensor device through the first diaphragm and the oil located in the first recess, wherein a pressure of the second fluid is transmitted to the sensor device through the second diaphragm and the oil located in the second recess, wherein a differential pressure between the pressure of the first fluid and the pressure of the second fluid is the pressure detected using the sensor device, and wherein the second diaphragm is made of a material having a pitting index, which is defined by an equation, (Cr+3.3Mo+20N), of 50 or greater and Ni content of 30 weight % or greater to prevent the second diaphragm from corroding due to the second fluid.

5. The pressure sensor according to claim 4, wherein the amount of the oil that is located on the first side is substantially equal to the amount of the oil that is located on the second side in order to reduce an error in electric signals outputted from the sensor device due to thermal contraction or expansion of the oil.

6. The pressure sensor according to claim 3 further comprising an adhesive including a resin, wherein the casing is made of a resin and wherein the adhesive is located between the first diaphragm and the casing to bond the first diaphragm to the casing.

7. The pressure sensor according to claim 4 further comprising an adhesive made of a resin, wherein the casing is made of a resin and wherein the adhesive is located between the first diaphragm and the casing and between the second diaphragm and the casing to bond the diaphragms to the casing.

8. The pressure sensor according to claim 6, wherein the adhesive includes a fluorosilicone resin or a fluoride resin.

9. The pressure sensor according to claim 3, wherein the casing includes a terminal for picking up electric signals outputted from the sensor device and wherein the terminal extends substantially parallel to a surface of the casing on which the sensor device is located from a position near the sensor device.

10. The pressure sensor according to claim 3, wherein the casing includes:
   a sensor device placement member, which includes the recess;
   a port member, which includes a pressure introduction port;
   one of a screw member and a rivet, wherein the sensor device placement member and the port member have been assembled using one of the screw member and the rivet.

11. The pressure sensor according to claim 7, wherein the adhesive includes a fluorosilicone resin or a fluoride resin.

12. The pressure sensor according to claim 4, wherein the casing includes a terminal for picking up electric signals outputted from the sensor device and wherein the terminal extends substantially parallel to a surface of the casing on which the sensor device is located from a position near the sensor device.

13. The pressure sensor according to claim 4, wherein the casing includes:
   a sensor device placement member, which defines the first and second sides;
   a first port member, which includes a first pressure introduction port;
   a second port member, which includes a second pressure introduction port;
   one of a screw member and a rivet, wherein the sensor device placement member and the port members have been assembled using one of the screw member and the rivet.

14. The pressure sensor according to claim 1, wherein the material, which makes up the first diaphragm, has a pitting index, which is defined by the equation, (Cr+3.3Mo+20N), of 52.5 or greater and Ni content of 35.5 weight % or greater.

15. The pressure sensor according to claim 1, wherein the first fluid is an exhaust gas emitted from a diesel engine.

* * * * *